United States Patent
Wang (10) Patent No.: US 10,346,353 B2
(45) Date of Patent: Jul. 9, 2019

(54) INTEGRATION DEVICE AND INTEGRATION METHOD THEREOF

(71) Applicant: Institute For Information Industry, Taipei (TW)

(72) Inventor: Chien Yao Wang, New Taipei (TW)

(73) Assignee: Institute For Information Industry, Taipei (TW)

( * ) Notice: Subject to any disclaimer, the term of this patent is extended or adjusted under 35 U.S.C. 154(b) by 773 days.

(21) Appl. No.: 14/944,942

(22) Filed: Nov. 18, 2015

(65) Prior Publication Data

US 2017/0124097 A1 May 4, 2017

(30) Foreign Application Priority Data

Nov. 2, 2015 (TW) .............................. 104136009 A (51) Int. Cl.
*G06F 16/00* (2019.01)
*G06F 16/11* (2019.01)
*G06F 16/178* (2019.01)
*G06F 16/25* (2019.01)

(52) U.S. Cl.
CPC .......... *G06F 16/122* (2019.01); *G06F 16/178* (2019.01); *G06F 16/25* (2019.01)

(58) Field of Classification Search
CPC ......... G06F 17/30554; G06F 17/30174; G06F 17/30368; G06F 16/25; G06F 16/178
See application file for complete search history.

(56) References Cited

U.S. PATENT DOCUMENTS

| 6,609,129 B1 | 8/2003 | Luh |
| 6,922,686 B2 * | 7/2005 | Okamoto ............... G06Q 10/08 707/687 |
| 2006/0230314 A1* | 10/2006 | Sanjar ..................... G06F 8/61 714/26 |
| 2007/0162482 A1 | 7/2007 | Flaxer et al. |
| 2013/0151264 A1 | 6/2013 | Heusermann et al. |

FOREIGN PATENT DOCUMENTS

| CN | 101477547 B | 5/2011 |
| CN | 103207859 A | 7/2013 |
| TW | 201227587 A | 7/2012 |

OTHER PUBLICATIONS

C. Batini, M. Lenzerini, and S.B. Navathe, "A Comparative Analysis of Methodologies for Database Schema Integration", ACM Computing Surveys, vol. 18, No. 4, pp. 323-364, Dec. 1986. (Year: 1986).*
Yuri Breitbart, Peter L. Olson, and Glenn R. Thompson, "Database Integration in a Distributed Heterogeneous Database System", IEEE, pp. 301-310. (Year: 1986).*
(Continued)

*Primary Examiner* — Cheryl Lewis
(74) *Attorney, Agent, or Firm* — Skaar Ulbrich Macari, P.A.

(57) ABSTRACT

An integration device and an integration method thereof are provided. The integration device includes a storage and a processor. The storage stores a first database which includes a plurality of first artifacts. The processor accesses the first database and a second database, and compares each second artifact of the second database with the first artifacts to update the first database.

16 Claims, 7 Drawing Sheets

(56) References Cited

OTHER PUBLICATIONS

Michael R. Genesereth, Arthur M. Keller, and Oliver M. Duschka, "Infomaster: An Information Integration System", ACM, pp. 539-542. (Year: 1997).*

Christine Parent and Stefano Spaccapietra, "Issues and Approaches of Database Integration", Magazine Communications of the ACM, vol. 41 Issue, May 1998, pp. 166-178. (Year: 1998).*

Amihai Motro, "Superviews: Virtual Integration of Multiple Databases" IEEE Transactions on Software Engineering, vol. SE-13, No. 7, Jul. 1987, pp. 785-798. (Year: 1987).*

Office Action to the corresponding Taiwan Patent Application No. 104136009 rendered by the Taiwan Intellectual Property Office (TIPO) dated May 26, 2016, 9 pages (including English translation).

\* cited by examiner

INTEGRATION DEVICE AND INTEGRATION METHOD THEREOF

PRIORITY

This application claims priority to Taiwan Patent Application No. 104136009 filed on Nov. 2, 2015, which is hereby incorporated by reference in its entirety.

FIELD

The present invention relates to an integration device and an integration method thereof. More particularly, the integration device of the present invention compares each artifact of other databases with a plurality of artifacts of a local database based on the artifacts of the local database, so as to integrate the artifacts of the other databases into the local database.

BACKGROUND

With the development of information industry, the amount of information required within enterprises is growing. To manage the massive information, the enterprises usually adopt management systems to manage various pieces of information necessary for the operation of the enterprises. The U.S. Publication Patent Application No. 2007/0162482A1 has proposed to construct the business process of enterprise operation and decide operations needed in system management by defining artifacts.

However, an enterprise usually adopts more than one management system, and each department thereof may also have its own management system. Since artifacts of different management systems usually have their own databases for storing their artifacts separately and information stored within different databases may be highly homogeneous and repetitive, it not only causes a waste of storage space but also increases the cost of hardware.

Accordingly, an urgent need exists in the art to integrate databases of several management systems so as to reduce the required storage space.

SUMMARY

The disclosure includes an integration method which compares each artifact of other databases with a plurality of artifacts of a local database based on the artifacts of the local database, so as to integrate the artifacts of the other databases into the local database. Accordingly, by the integration method of the present invention, databases of several management systems can be integrated so as to reduce the required storage space.

The disclosure includes an integration device which comprises a storage and a processor. The storage is configured to store a first database. The first database includes a plurality of first artifacts, and each of the plurality of first artifacts has a first name, a first operation set, and a first parameter set. The processor is electrically connected to the storage and is configured to access the first database and a second database and to execute the following operations of: (a) reading a second artifact from the second database, wherein the second artifact has a second name, a second operation set, and a second parameter set; (b) comparing the second artifact with the first artifacts of the first database so as to determine whether the first artifacts of the first database include a target artifact of which the first name is the same as the second name of the second artifact; (c) if the first database does not include the target artifact, adding the second artifact into the first database to update the first database; (d) if the first database includes the target artifact, determining whether at least one parameter in the second parameter set is not included in the first parameter set of the target artifact; and (e) if the at least one parameter in the second parameter set is not included in the first parameter set of the target artifact, adding the at least one parameter into the first parameter set of the target artifact, and modifying the first operation set of the target artifact according to the at least one parameter so as to update the first database.

Moreover, the disclosure includes an integration method for use in an integration device. The integration device comprises a storage and a processor. The storage stores a first database. The first database includes a plurality of first artifacts. Each of the plurality of first artifacts has a first name, a first operation set, and a first parameter set. The processor is electrically connected to the storage and is configured to access the first database and a second database. The integration method is executed by the processor and comprises the following steps of: (a) reading a second artifact from the second database, wherein the second artifact has a second name, a second operation set, and a second parameter set; (b) comparing the second artifact with the first artifacts of the first database so as to determine whether the first artifacts of the first database include a target artifact of which the first name is the same as the second name of the second artifact; (c) if the first database does not include the target artifact, adding the second artifact into the first database to update the first database; (d) if the first database includes the target artifact, determining whether at least one parameter in the second parameter set is not included in the first parameter set of the target artifact; and (e) if the at least one parameter in the second parameter set is not included in the first parameter set of the target artifact, adding the at least one parameter into the first parameter set of the target artifact, and modifying the first operation set of the target artifact according to the at least one parameter so as to update the first database.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to embodiments thereof. However, these embodiments of the present invention are not intended to limit the present invention to any particular environment, applications or implementations described in these embodiments. Therefore, description of these embodiments is only for purpose of illustration rather than to limit the present invention. It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
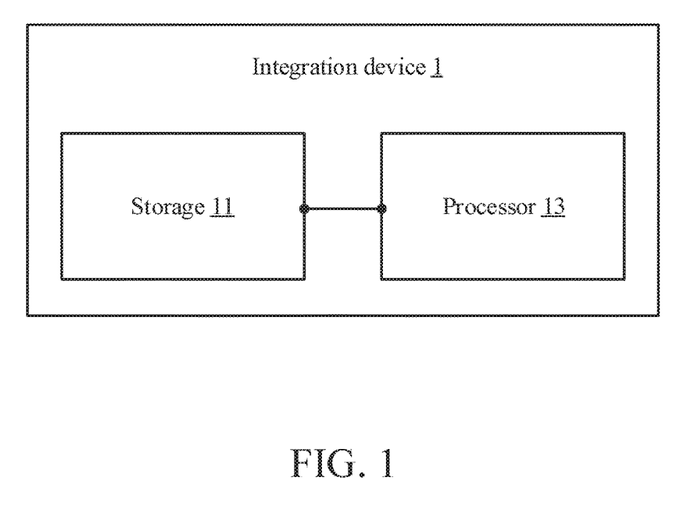
FIG. 1 is a schematic view of an integration device 1 according to a first embodiment of the present invention.
Figure 2:
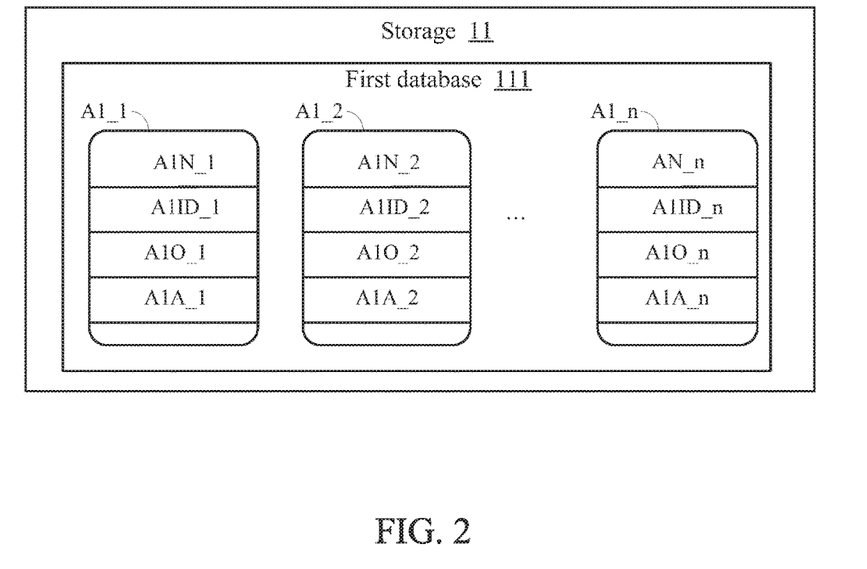
FIG. 2 depicts a storage 11 storing a first database 111.
Figure 3:
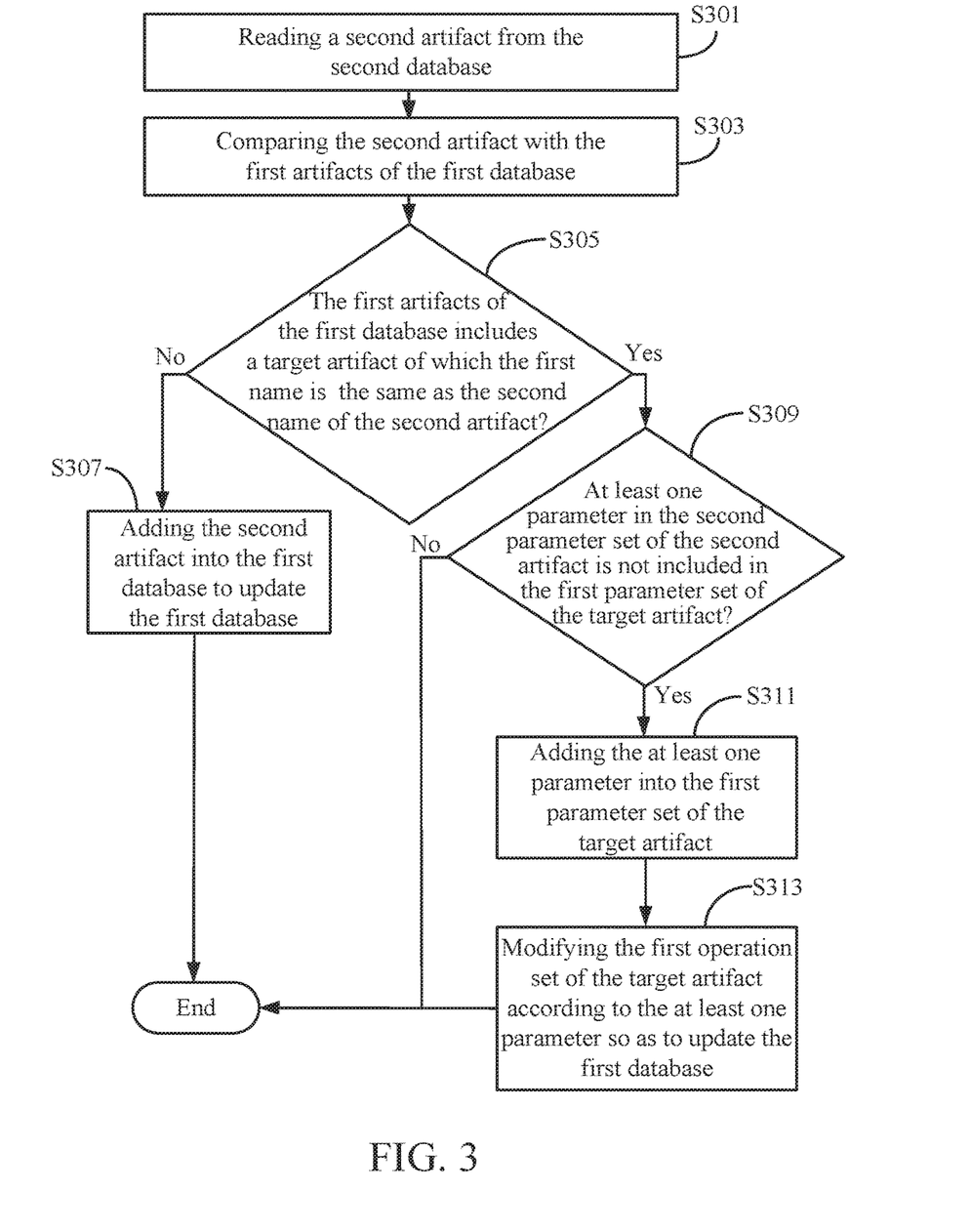
FIG. 3 is a flowchart diagram of an integration method according to the first embodiment of the present invention.

A first embodiment of the present invention is as shown in FIG. 1 to FIG. 6. FIG. 1 is a schematic view of an integration device 1 of the present invention. The integration device 1 comprises a storage 11 and a processor 13. The integration device 1 may be a network server or any device capable of accessing and processing data. The processor 13 is electrically connected to the storage 11. The storage 11 stores a first database 111, as shown in FIG. 2. The first database 111 includes a plurality of first artifacts $A1\_1$, $A1\_2, \ldots, A1\_n$, and the first artifacts $A1\_1$ to $A1\_n$ respectively have: first names $A1N\_1, A1N\_2, \ldots, A1N\_n$; first instance identifiers $A1ID\_1, A1ID\_2, \ldots, A1ID\_n$; first operation sets $A1O\_1, A1O\_2, \ldots, A1O\_n$; and first parameter sets $A1A\_1, A1A\_2, \ldots, A1A\_n$. The "n" in the first artifact $A1\_n$, the first name $A1N\_n$, the first instance identifier $A1ID\_n$, and the first parameter set $A1A\_n$ is a positive integer. The processor 13 accesses the first database 111 and a second database 211 and executes an integration method, and the flowchart diagram of the integration method is as shown in FIG. 3.

Firstly, in step S301, a second artifact (e.g., $A2\_1$) is read by the processor 13 from the second database 211. Similarly, the second artifact $A2\_1$ has a second name $A2N\_1$, a second instance identifier $A2ID\_1$, a second operation set $A2O\_1$, and a second parameter set $A2A\_1$. Next, in step S303, the second artifact $A2\_1$ is compared by the processor 13 with the first artifacts $A1\_1$ to $A1\_n$ of the first database 111. Thereafter, in step S305, it is determined by the processor 13 whether the first artifacts $A1\_1$ to $A1\_n$ of the first database 111 include a target artifact of which the first name is the same as the second name of the second artifact $A2\_1$.

Figure 4:
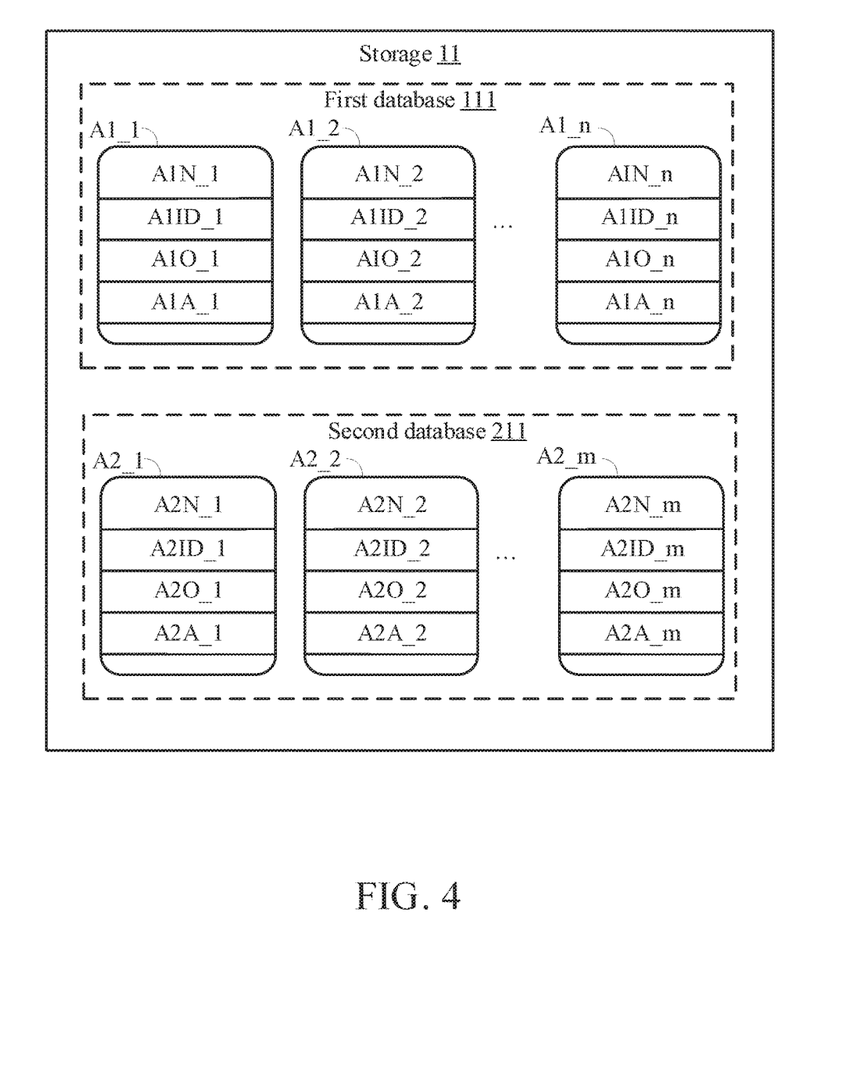
FIG. 4 depicts the storage 11 storing the first database 111 and a second database 211.

Specifically, the second database 211 may also be stored in the storage 11 of the integration device 1 and includes a plurality of second artifacts $A2\_1, A2\_2, \ldots, A2\_m$, and the second artifacts $A2\_1$ to $A2\_m$ respectively have: second names $A2N\_1, A2N\_2, \ldots, A2N\_m$; second instance identifiers $A2ID\_1, A2ID\_2, \ldots, A2ID\_m$; second operation sets $A2O\_1, A2O\_2, \ldots, A2O\_m$; and second parameter sets $A2A\_1, A2A\_2, \ldots, A2A\_m$, as shown in FIG. 4. The "m" in the second artifact $A2\_m$, the second instance identifier $A2ID\_m$, the second operation set $A2O\_m$ and the second parameter set $A2A\_m$ is a positive integer. For example, the integration device 1 may be a network server within an enterprise, and the first database 111 and the second database 211 respectively belong to two different management systems within the enterprise, or respectively belong to two identical management systems but correspond to different departments. Moreover, the two management systems may operate in this network server or respectively operate in other network servers.

Figure 5:
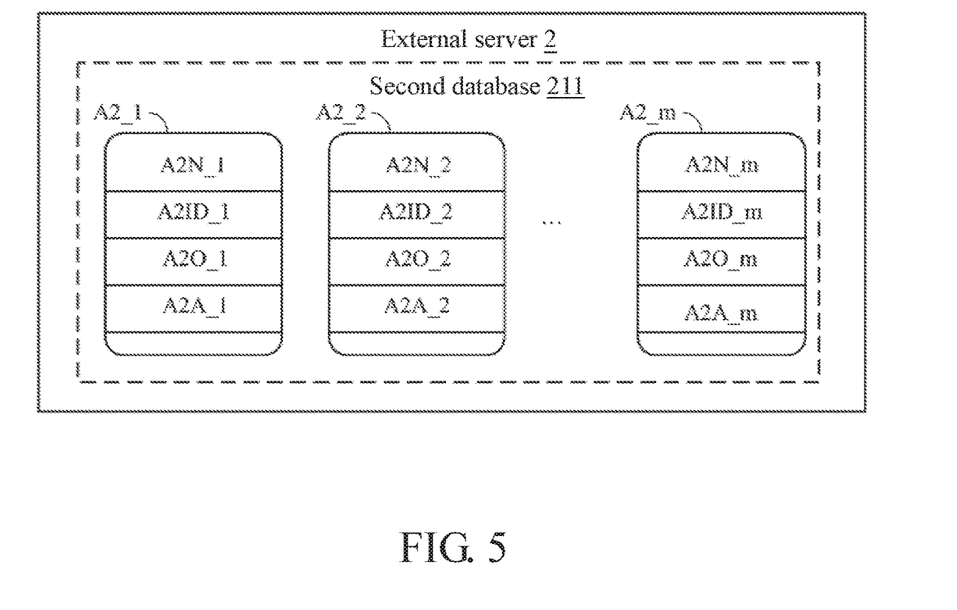
FIG. 5 depicts an external server 2 storing the second database 211.
Figure 6:
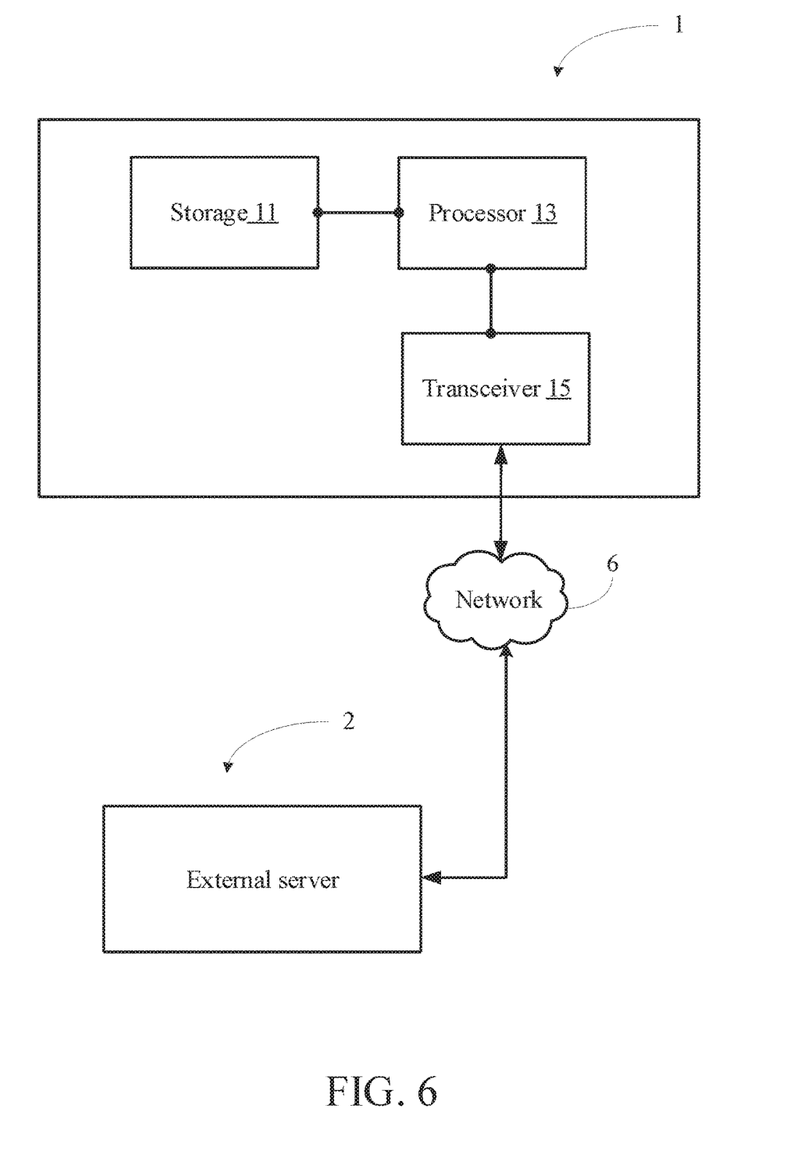
FIG. 6 is a schematic view of an integration device 1 according to an embodiment of the present invention.
Figure 7:
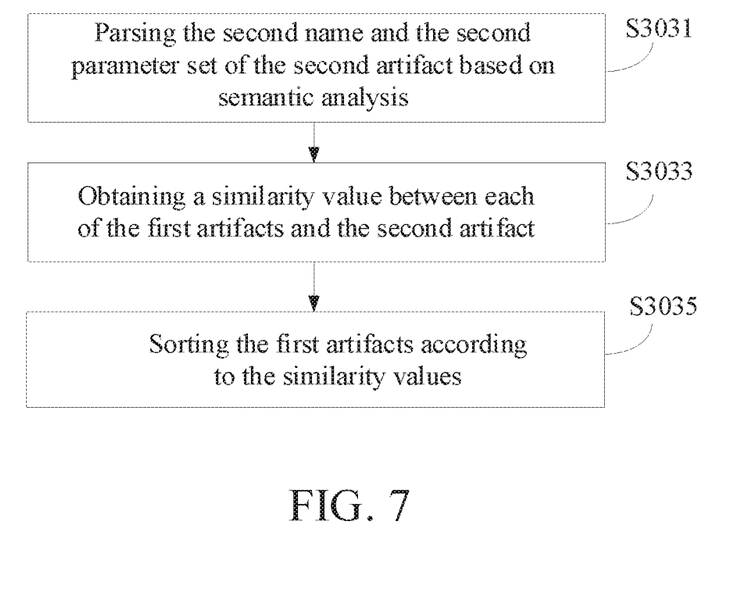
FIG. 7 is a flowchart diagram of an integration method according to a second embodiment of the present invention.

Moreover, the second database 211 may also be stored in an external server 2, as shown in FIG. 5. In this case, the integration device 1 of the present invention further comprises a transceiver 15, and the transceiver 15 is electrically connected to the processor 13 and is connected to the external server 2 via a network 6, as shown in FIG. 6. The network 6 may be a local area network (LAN), an Internet, a mobile network, or any combination of the aforesaid networks, but is not limited thereto. For example, the integration device 1 may be a network server within an enterprise, and the network server stores the first database 111 for use by a management system; while the external server 2 may be another network server within the enterprise, and the another network server stores the second database 211 for use by another management system.

Thereafter, if the first database 111 does not include the target artifact (i.e., all the first names of the first artifacts $A1\_1$ to $A1\_n$ are different from the second name of the second artifact $A2\_1$), then step S307 is executed by the processor 13 to add the second artifact $A2\_1$ into the first database 111 to update the first database 111. Further speaking, in the step S307, in order to integrate the second artifact $A2\_1$ into the first database 111 as a first artifact (e.g., a first artifact $A1\_n+1$) in the first database 111, the processor 13 creates a first instance identifier (e.g., a first instance identifier $A1ID\_n+1$) to replace the second instance identifier $A2ID\_1$ of the second artifact $A2\_1$, and accordingly adds the altered second artifact $A2\_1$ into the first database 111 as the first artifact $A1\_n+1$.

On the other hand, if the first database 111 includes the target artifact (i.e., the first name of one of the first artifacts $A1\_1$ to $A1\_n$ is the same as the second name of the second artifact $A2\_1$), then step S309 is executed by the processor 13 to determine whether at least one parameter in the second parameter set of the second artifact $A2\_1$ is not included in the first parameter set of the target artifact. Further speaking, in step S309, if the processor 13 finds that the first name $A1N\_1$ of a first artifact (e.g., the first artifact $A1\_1$) is the same as the second name $A2N\_1$ of the second artifact $A2\_1$ as a result of the comparison, then the processor 13 regards the first artifact $A1\_1$ as the target artifact and further analyzes differences between the first parameter set $A1A\_1$ of the first artifact $A1\_1$ and the second parameter set $A2A\_1$ of the second artifact $A2\_1$, in order to integrate the second artifact $A2\_1$ into the first database 111.

If at least one parameter in the second parameter set $A2A\_1$ is not included in the first parameter set $A1A\_1$ of the target artifact, then step S311 is executed to add the at least one parameter into the first parameter set $A1A\_1$ of the target artifact. Next, step S313 is executed to modify the first operation set $A1O\_1$ of the target artifact according to the at least one parameter so as to update the first database 111. On the contrary, if all the parameters in the second parameter set $A2A\_1$ are included in the first parameter set $A1A\_1$ of the target artifact, then the processor 13 ends these operations of the integration method, i.e., the first database 111 need not be updated.

For example, it is assumed that both the first name $A1N\_1$ of the first artifact $A1\_1$ and the second name $A2N\_1$ of the second artifact $A2\_1$ are "User", the first parameter set $A1A\_1$ has the following parameters: "Name", "Personal Telephone Number", "Home Address", and "Company Extension Number", while the second parameter set $A2A\_1$ has the following parameters: "Name", "E-mail", and "Company Extension Number". After determining that the first name $A1N\_1$ of the first artifact $A1\_1$ is the same as the second name $A2N\_1$ of the second artifact $A2\_1$ (i.e., both of them are "User") and the parameter "E-mail" in the second parameter set $A2A\_1$ is not included in the first parameter set $A1A\_1$, the processor 13 adds the parameter "E-mail" into the first parameter set $A1A\_1$ and modifies the first operation set $A1O\_1$ according to an operation in the second operation set $A2O\_1$ that corresponds to the parameter "E-mail" so that the first operation set $A1O\_1$ has the operation corresponding to the parameter "E-mail". In other words, when the management system accesses the first database 111 and operates on the user information after the first artifact A1_1 is updated, the management system can obtain operations about adding, reading, updating or deleting the parameter "E-mail" from the first artifact A1_1.

Based on the operations of the integration method depicted in FIG. 3, the integration device 1 of the present invention can integrate the second artifact A2_1 into the first database 111; and meanwhile, by repeating these operations of the integration method to sequentially access and compare each of the second artifacts A2_1 to A2_m of the second database 211 with the first artifacts A1_1 to A1_n of the first database 111, all the second artifacts A2_1 to A2_m of the second database 211 can be integrated into the first database 111.

A second embodiment of the present invention is an extension of the first embodiment. In this embodiment, the step S303 further comprises steps as shown in the flowchart diagram of FIG. 5. Step S3031 is executed by the processor 13 to parse the second name and the second parameter set of a second artifact (e.g., the second artifact A2_1) based on semantic analysis. In step S3033, the processor 13 can obtain a similarity value between each of the first artifacts A1_1 to A1_n and the second artifact A2_1 through the semantic analysis. Thereafter, step S3035 is executed to sequence by the processor 13 the first artifacts A1_1 to A1_n according to the similarity values.

In particular, the processor 13 parses the second name and the second parameter set of a second artifact that is to be compared with the first artifacts A1_1 to A1_n, and obtains a similarity value between each of the first artifacts A1_1 to A1_n and the compared second artifact according to semantic similarity. Thereby, the processor 13 can sequence the first artifacts A1_1 to A1_n according to these similarity values, and determines whether the first name of the first artifact with a higher similarity value is the same as the second name of the second artifact so as to execute the step S305.

Furthermore, in other embodiments, the processor 13 may further generate an update record list according to the similarity values and the update of the first database. In this way, personnel responsible for managing or operating the integration device 1 can know from the update record list the details in integrating the A2_1 to A2_m into the first database 111 so as to make further confirmation or adjustment. Moreover, the processor 13 may store the update record list into the first database 111, output the update record list by a printer, send the update record list to relevant personnel via E-mails, or store the update record list into other network servers.

Additionally, in other embodiments, after the first database 111 is updated (i.e., after the step S313), the processor 13 may archive the compared second artifact and record the first instance identifier of the first artifact into which the second artifact is integrated. For example, when the second artifact A2_1 is integrated into the first artifact A1_1, the processor 13 archives the second artifact A2_1 and records the first instance identifier A1ID_1 of the corresponding first artifact A1_1.

According to the above descriptions, the present invention provides an artifact-based integration device and an integration method thereof, which compare the artifacts of other databases with the artifacts of the local database to integrate the artifacts of the other databases into the local database. In this way, through the integration method of the present invention, not only the databases of several management systems can be integrated to reduce the required storage space, but the complexity in introducing new management systems into the enterprise is reduced.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An integration device, comprising:
 a storage, being configured to store a first database which includes a plurality of first artifacts, each of the plurality of first artifacts having a first name, a first operation set, and a first parameter set;
 a processor electrically connected to the storage, being configured to access the first database and a second database and to execute the following operations of:
 (a) reading a second artifact from the second database, wherein the second artifact has a second name, a second operation set, and a second parameter set;
 (b) comparing the second artifact with the first artifacts of the first database so as to determine whether the first artifacts of the first database include a target artifact of which the first name is the same as the second name of the second artifact;
 (c) if the first database does not include the target artifact, adding the second artifact into the first database to update the first database;
 (d) if the first database includes the target artifact, determining whether at least one parameter in the second parameter set is not included in the first parameter set of the target artifact; and
 (e) if the at least one parameter in the second parameter set is not included in the first parameter set of the target artifact, adding the at least one parameter into the first parameter set of the target artifact, and modifying the first operation set of the target artifact according to the at least one parameter so as to update the first database.

2. The integration device of claim 1, further comprising:
 a transceiver electrically connected to the processor and connected to an external server via a network, wherein the external server stores the second database, and the processor further accesses the second database from the external server through the transceiver.

3. The integration device of claim 1, wherein the storage is further configured to store the second database.

4. The integration device of claim 1, wherein each of the first artifacts of the first database further comprises a first instance identifier.

5. The integration device of claim 1, wherein the operation (c) further comprises the following operation of:
 creating a first instance identifier and inserting the first instance identifier into the second artifact.

6. The integration device of claim 1, wherein the processor further archives the second artifact.

7. The integration device of claim 1, wherein the operation (b) further comprises the following operations of:
 parsing the second name and the second parameter set of the second artifact based on a semantic analysis so as to obtain a similarity value between each of the first artifacts and the second artifact; and
 sorting the first artifacts according to the similarity values.

8. The integration device of claim 7, wherein the processor further generates an update record list according to the similarity values and the update of the first database.

9. An integration method for use in an integration device, the integration device comprising a storage and a processor, the storage storing a first database which includes a plurality of first artifacts, each of the plurality of first artifacts having a first name, a first operation set, and a first parameter set, the processor electrically connected to the storage and being configured to access the first database and a second database, the integration method being executed by the processor and comprising the following steps of:
- (a) reading a second artifact from the second database, wherein the second artifact has a second name, a second operation set, and a second parameter set;
- (b) comparing the second artifact with the first artifacts of the first database so as to determine whether the first artifacts of the first database include a target artifact of which the first name is the same as the second name of the second artifact;
- (c) if the first database does not include the target artifact, adding the second artifact into the first database to update the first database;
- (d) if the first database includes the target artifact, determining whether at least one parameter in the second parameter set is not included in the first parameter set of the target artifact; and
- (e) if the at least one parameter in the second parameter set is not included in the first parameter set of the target artifact, adding the at least one parameter into the first parameter set of the target artifact, and modifying the first operation set of the target artifact according to the at least one parameter so as to update the first database.

10. The integration method of claim 9, wherein the integration device further comprises a transceiver that is electrically connected to the processor and connected to an external server via a network, and the integration method further comprises the following step of:
accessing the second database from the external server through the transceiver.

11. The integration method of claim 9, wherein the storage is further configured to store the second database.

12. The integration method of claim 9, wherein each of the first artifacts of the first database further comprises a first instance identifier.

13. The integration method of claim 9, wherein the step (c) further comprises the following operation of:
creating a first instance identifier and inserting the first instance identifier into the second artifact.

14. The integration method of claim 9, further comprising the following step of:
archiving the second artifact.

15. The integration method of claim 9, wherein the step (b) further comprises the following operations of:
parsing the second name and the second parameter set of the second artifact based on a semantic analysis so as to obtain a similarity value between each of the first artifacts and the second artifact; and
sorting the first artifacts according to the similarity values.

16. The integration method of claim 15, further comprising the following step of:
generating an update record list according to the similarity values and the update of the first database.

* * * * *